Patented July 15, 1947

2,424,199

UNITED STATES PATENT OFFICE 2,424,199

1,3-EPOXYARYLOFURAZANES AS PARASITICIDAL PREPARATIONS

William P. ter Horst, Pompton Plains, N. J., assignor to United States Rubber Company, New York, N. Y., a corporation of New Jersey No Drawing. Application November 14, 1942, Serial No. 465,629

15 Claims. (Cl. 167—33)

This invention relates to new and useful improvements in parasiticidal preparations.

More particularly the invention relates to parasiticides which may used as fungicides, seed protectants, insecticides, insect repellents, or bactericides.

This case is a continuation-in-part of my application Serial No. 283,817, filed July 11, 1939, now Patent No. 2,302,384, issued November 7, 1942.

The parasiticidal compositions contain as an active constituent a halogenated 1,3-epoxyarylofurazane compound. In Patent No. 2,302,384, compounds that are considered in this application as epoxyarylofurazanes were considered as orthoquinone dioxime peroxides, following the nomenclature of the para compounds. The corresponding chlorinated compounds in the prior application thus were considered to have a formula such as

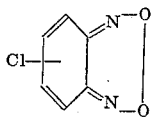

Other authorities consider the compounds as arylofurazane oxides, the chlorinated compounds having a formula such as

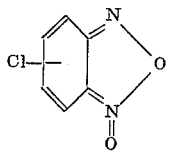

It is now believed the best authorities consider the compounds to have a non-quinoid structure and as such would be epoxyarylofurazanes, the chlorinated compounds having a formula such as

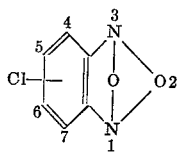

The compounds will be considered as epoxyarylofurazanes in this application.

Examples of the compounds of the invention are 5-chloro-1,3-epoxybenzofurazane, 4-chloro-1,3-epoxybenzofurazane, and 5-chloro-1,3-epoxynaphtho[1,2]furazane. A method of preparing the compounds is described in J. Chem. Soc, 103, 897–901 T (1913).

The compositions may be used in the form of sprays or dusts, alone or in combination with other fungicides or insecticides, or in combination with fertilizers or with suitable auxiliary agents such as wetting agents, sticking agents, spreading agents, etc.

As seed protectants or fungicides the compositions are of outstanding value in controlling the phenomenon which is usually called "damping off" which causes a decrease in the percentage of germination, low speed of emergence, and nonvigorous plants due to soil fungi which are harmful to the seed and the sprout, such as the Pythium spore, the Fusarium spore, and the Rhizoctania spore. The active compound also functions as a lubricant for the seed, resulting in less interlocking of the seeds in the seed drill and in less damage to the seed and to the equipment. This is in contrast with most of the chemical dusts that are used commercially at the present time, as most of these increase the friction.

The test described below demonstrates the effectiveness of the new fungicide in preventing spore germination:

An aqueous solution or suspension of 5-chloro-1,3 - epoxybenzofurazane containing 5 grams thereof per liter of water was prepared. This solution or suspension was sprayed on glass slides which had previously been coated with nitrocellulose. An atomizer was used capable of delivering 10 cc. spray liquid in 36 seconds. A glass slide was positioned two feet away from the nozzle of the atomizer. Spraying was carried out for, respectively, 3 seconds, 5½ seconds, 8 seconds, 10½ seconds, and 13 seconds. The spray deposit was allowed to dry. The sprayed slide was then inoculated with the test organism, *Macrosporium sarcinaeforme*, and germination was allowed to take place in a moist chamber at 25° C. On the untreated slides usually approximately 98% of the spores germinated. On all of the treated slides the percent of germination was zero.

The effectiveness of the chemical as a seed protectant is illustrated by the following test:

Pea seed of the variety "Wilt Resistant Perfection" was dusted with .25% by weight of 5-chloro-1,3-epoxybenzofurazane by tumbling the same and the seed in a container until mixing has been accomplished. The seed was then put in a soil known to be infested with pathogenic fungi. Examination of the seeds after eight days showed 68% germination of the treated seeds, and only 25% germination of untreated (control) seeds.

The effectiveness of the chemical as a bactericide is illustrated by the following test:

Potato sections were treated with a 1% aqueous suspension of 5-chloro-1,3-epoxybenzofurazane containing a small amount of a non-bacteriacidal emulsifying agent and exposed to air containing naturally occurring bacteria, together with untreated sections. The untreated sections after one week showed a heavy growth of bacteria while the treated sections showed no bacterial growth in a month.

The effectiveness of the chemical as an insecticide is shown by the following test:

Five meal worm larvae (*Tenebrio molitor*) were treated with a 50% acetone solution of 5-chloro-1,3-epoxybenzofurazane by applying the solution to the dorsal thoraxic region by means of the platinum loop technique. After 48 hours all of the larvae were dead.

The materials described herein may be applied undiluted, or with a carrier, as suspended in water or other vehicle, or mixed with talc, clay and the like, or as aforesaid may be used in admixture with other parasiticidal chemicals.

Having thus described my invention, what I claim and desire to protect by Letters Patent is:

1. The method of protecting organic material subject to attack by organisms which comprises treating said material with a halogenated 1,3-epoxyarylofurazane.

2. The method of protecting organic material subject to attack by organisms which comprises treating said material with a chlorinated 1,3-epoxyarylofurazane.

3. The method of protecting organic material subject to attack by organisms which comprises treating said material with 5-chloro-1,3-epoxybenzofurazane.

4. The method of protecting seeds which comprises treating the seeds with a halogenated 1,3-epoxyarylofurazane.

5. The method of protecting seeds which comprises treating the seeds with a chlorinated 1,3-epoxyarylofurazane.

6. The method of protecting seeds which comprises treating the seeds with 5-chloro-1,3-epoxybenzofurazane.

7. The method which comprises applying a halogenated 1,3-epoxyarylofurazane to loci to be protected against fungi, bacteria and insects.

8. The method which comprises applying a chlorinated 1,3-epoxyarylofurazane to loci to be protected against fungi, bacteria and insects.

9. The method which comprises applying 5-chloro-1,3-epoxybenzofurazane to loci to be protected against fungi, bacteria and insects.

10. A parasiticidal composition comprising an aqueous suspension of a halogenated 1,3-epoxyarylofurazane said suspension containing an emulsifying agency.

11. A fungicidal composition comprising an aqueous suspension of a chlorinated 1,3-epoxyarylofurazane said suspension containing an emulsifying agent.

12. A fungicidal composition comprising an aqueous suspension of 5-chloro-1,3-epoxybenzofurazane said suspension containing an emulsifying agent.

13. A parasiticidal composition comprising a halogenated 1,3-epoxyarylofurazane and a carrier therefor selected from the group consisting of talc and clay and water in which the chemical is suspended.

14. A fungicidal composition comprising a chlorinated 1,3-epoxyarylofurazane and a carrier therefor selected from the group consisting of talc and clay and water in which the chemical is suspended.

15. A fungicidal composition comprising 5-chloro-1,3-epoxybenzofurazane and a carrier therefor selected from the group consisting of talc and clay and water in which the chemical is suspended.

WILLIAM P. TER HORST.

REFERENCES CITED

The following references are of record in the file of this patent:

UNITED STATES PATENTS

| Number | Name | Date |
|---|---|---|
| 2,302,384 | Ter Horst | Nov. 17, 1942 |
| 2,318,388 | Hartman et al. | May 4, 1943 |